UNITED STATES PATENT OFFICE.

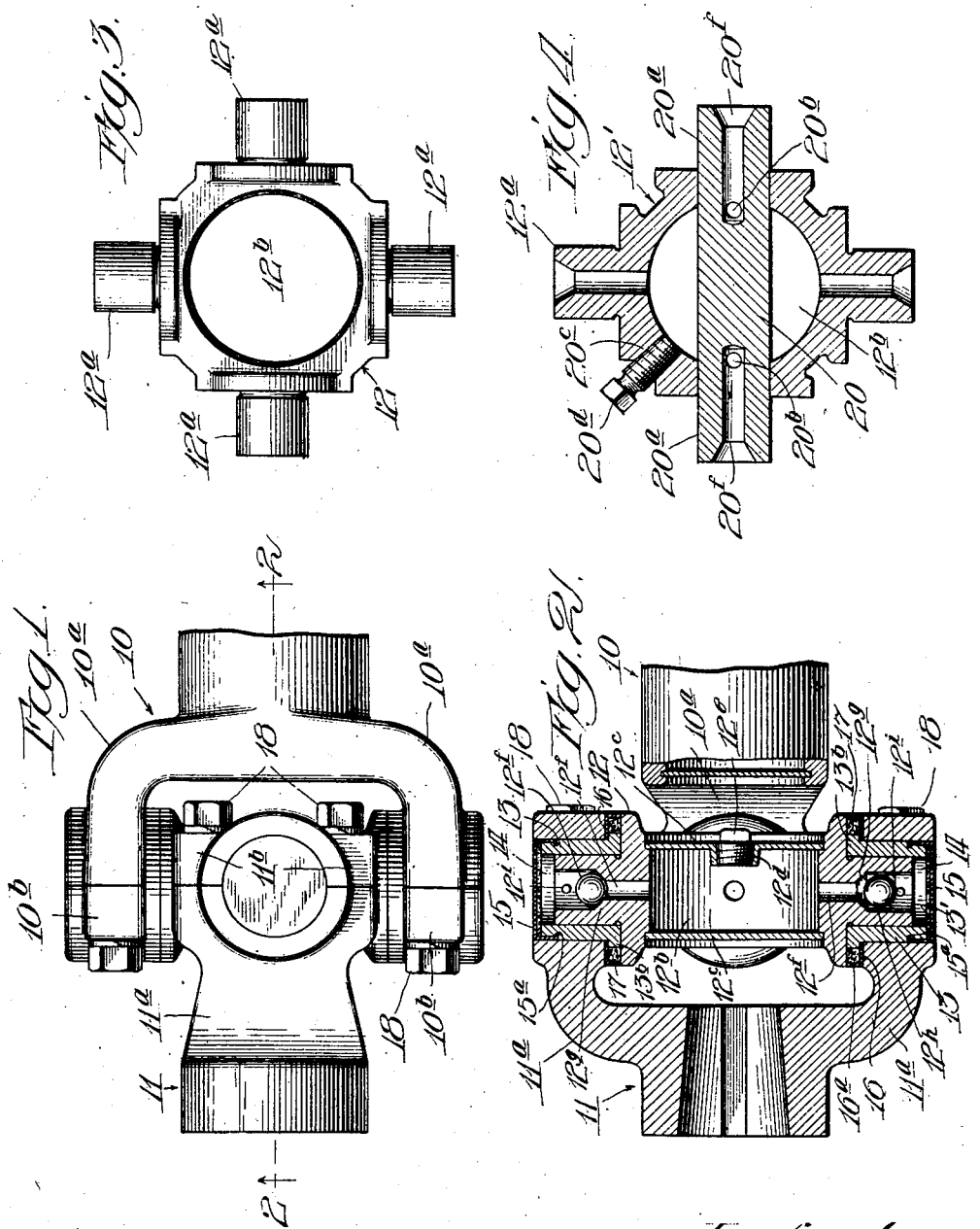

BURTT J. HUBBARD, OF KOKOMO, INDIANA.

UNIVERSAL JOINT.

1,362,000.	Specification of Letters Patent.	Patented Dec. 14, 1920.

Application filed March 13, 1919. Serial No. 282,337.

*To all whom it may concern:*

Be it known that I, BURTT J. HUBBARD, a citizen of the United States, residing at Kokomo, in the county of Howard and State of Indiana, have invented certain new and useful Improvements in Universal Joints, of which the following is a specification.

This invention relates to improvements in universal joints, and has for its object to provide a new and improved form of universal joint adapted for use in automobile construction, and one which is self-lubricating and permits the use of a fluid lubricant, such as oil, in contradistinction to the present style of universal joint, which must be packed in grease for proper operation.

These and other objects of the invention will be more fully described and set forth in the following specification, taken in connection with the accompanying drawing, in which—

Figure 1 is a side elevation of my universal joint;

Fig. 2 is a vertical section taken on the line 2—2 of Fig. 1.

Fig. 3 is an end elevation of the universal block member; and

Fig. 4 is a vertical section through the block member showing a modified construction.

Like numerals refer to like elements throughout the drawing, in which—

10 designates generally one yoke, which may be a driving member, or a driven member as the case may be, having yoke arms $10^a$, as shown in Fig. 1. 11 designates the coacting yoke having arms $11^a$, these arms being disposed at right angles to the arms $10^a$, as is customary. Coacting with the yokes is the center or block member 12, as I term it, provided with four projecting trunnions or bosses $12^a$. The block 12 is centrally hollowed, as indicated by the bore $12^b$, and this bore constitutes a reservoir sealed at each end by tightly fitting caps, of the form shown in Fig. 2. One of these caps is provided with a filler opening $12^d$ normally closed by means of the plug $12^e$. Leading from the reservoir $12^b$ outwardly through each of the trunnions $12^a$ are ducts $12^f$, as shown, for example in Fig. 2.

In the embodiment shown I provide the ducts $12^f$ with valve seats $12^g$, and mounted in such ducts are the ball checks $12^h$, retained therein by cross pins $12^i$. The pins are spaced from the valve seats a sufficient distance to permit the ball checks to move therefrom when the trunnions pass from uppermost position. In each trunnion duct, as it arrives at uppermost position, the ball check $12^h$ seating on the seat $12^g$ will entrap a portion of the lubricant above it, and thereby prevent it from draining back into the reservoir $12^b$. This insures the retention of the oil in the uppermost trunnion or trunnions when at rest, so that, upon starting, a delivery of oil to the bearings is immediate. Centrifugal force holding the oil in the other trunnions might prevent a supply reaching these uppermost trunnions, especially when the total oil in the reservoir is small. Surrounding each of these trunnions are the bearings 13, extending at their outer end beyond the trunnions to form the chambers or current spaces 14. At their outer ends the bearings are sealed or capped by means of packing caps of some resilient material, such as rubber, felt, or the like, such packing caps being in turn inclosed by caps 15 swaged inwardly at $15^a$ into grooves provided for that purpose in the outer periphery of the bearing members, this construction being for the purpose of preventing leakage of lubricant. At their inner ends the bearings 13 are provided with peripheral flanges $13^b$, and surrounding these flanges are the retainers 16, each having an angularly disposed flange $16^a$, between which and the flange $16^b$ is located a packing washer 17. It will be seen from an examination of Figs. 2 and 3, for example, that—the trunnions $12^a$ being of reduced diameter with respect to the mounting of the block member—the inner ends of the bearings, together with the washers, will contact or lie closely adjacent the surface surrounding the trunnions, the contact between such surface and the washers 17 being provided to prevent entrance of dust or the like into the main bearing surface. The ducts $12^f$ communicate with the chambers 14, as shown in Fig. 2.

The extremities of the yoke arms $10^a$ and $11^a$ are capped by the caps $10^b$ and $11^b$, respectively, these caps being maintained in assembled position by means of cap screws 18. This construction permits the removal of these caps to permit relative disassembling of the yokes with respect to the bearing members 13 when so desired.

In the operation of my device, when the same is properly assembled, as shown in

Figs. 1 and 2, for example, the reservoir 12ᵇ having previously filled with fluid lubricant through the filler opening 12ᵈ the bearing fit between the bearings 13 and the trunnions 12ᵃ will prevent flow of the lubricant from the lowermost of the chambers 14; but when the shafts are rotated centrifugal force obtains, and lubricant is driven through the ducts 12ᶠ into the chambers 14 under a pressure varying with the speed of rotation. This insures the supplying of the very small quantity of lubricant needed to the bearing surfaces between the trunnions and the bearings. Inasmuch as the lubricant in lubricating these surfaces must flow inwardly toward the center of rotation against the centrifugal force obtaining, it will be apparent that only the excess of pressure due to the centrifugal head—if it can be so termed—will force the flow of lubricant to the bearing surfaces. In this way leakage is prevented, and, as has been stated, when the joint is at rest there is no leakage, since no centrifugal force obtains.

By this construction it is unnecessary to replenish the supply of oil in the reservoir at the end of a normal season's operation, such, for example, as twelve to fifteen thousand miles of automobile travel; and I am further able to dispense with the impractical and awkward grease containers which are now in use to maintain a supply of grease around the rotating joint, and the leakage resulting from an accumulation of dirt, etc., is also eliminated.

In Fig. 4 I have shown a modified form of construction, in which a pair of oppositely disposed bosses are formed by the insertion of a shaft or a pin 20 having its ends projecting from the block 12 to form the trunnions 20ᵃ, similar to the other trunnions previously described. These bosses are provided with cross ducts 20ᵇ communicating with the reservoir 12ᵇ, and also with the trunnion-lubricating ducts 20ᶠ. The other pair of trunnions 12ᵃ are similar to those shown in the above described form, although it is obvious that they may be replaced by pins, or the like. A filler opening 20ᶜ projects from one corner of the side of the block 12′, and is normally sealed by means of the block 20ᵈ. This location of the filler opening makes the filling slightly easier, in that it is not necessary to disassemble the universal joint.

It will be obvious that my construction is susceptible of modifications and improvements; and I do not therefore wish to be restricted to the form described, save as defined in the appended claims.

I claim:—

1. In a device of the class described, a driving yoke and a driven yoke, said yokes being provided with bearing members, a block member having trunnions, said trunnions being journaled in the bearing members of said yokes and said block members being provided with a lubricant reservoir, and ducts leading therefrom to said bearing members through said trunnion members, the latter being provided with a check valve means in said ducts.

2. In a device of the class described, a driving yoke and a driven yoke, said yokes being provided with bearing members, a block member having trunnions, said trunnions being journaled in the bearing members of said yokes and said block members being provided with a lubricant reservoir, and ducts leading therefrom to said bearing members through said trunnion members, the latter being provided with a check valve means in said ducts operable to prevent drawing back of lubricant from said ducts to said reservoir.

In testimony whereof I have subscribed my name.

BURTT J. HUBBARD.